UNITED STATES PATENT OFFICE.

WILLIAM RINTOUL AND DONALD CROSS, OF STEVENSTON, SCOTLAND, ASSIGNORS TO NOBEL'S EXPLOSIVES COMPANY LIMITED, OF STEVENSTON, SCOTLAND.

EXPLOSIVE.

1,303,115.     Specification of Letters Patent.     Patented May 6, 1919.

No Drawing.     Application filed September 24, 1917. Serial No. 192,963.

*To all whom it may concern:*

Be it known that we, WILLIAM RINTOUL and DONALD CROSS, both subjects of the King of Great Britain and Ireland, and residing at Ardeer Factory, Stevenston, Ayrshire, Scotland, have invented certain new and useful Improvements in Explosives, of which the following is a specification.

This invention relates to the manufacture of blasting explosives containing nitroglycerin and gelatinized nitrocellulose and in which the ratio of nitroglycerin to nitrocotton is large.

It is known that certain substances which possess limited gelatinizing power may have this property increased by the addition to them of other substances, and it has been proposed to promote the solubility upon which gelatinization depends by the addition of a small quantity of substances such as the acetic ethers of gylcerin, ethyl and methyl, acetic acid, a mixture of alcohol and ether, acetone, nitro-benzol, dinitro-benzol, the nitrates of methyl and ethyl, and other analogous substances.

It was proposed to employ a proportion of the substance depending on its nature but as a rule about 10% of the weight of the nitroglycerin is employed. Further that by the use of heat the quantity to be used could be reduced to 2% or even less.

Notwithstanding this proposition and as the use of the larger proportions of such substances indicated for cold working are disadvantageous, in the methods of manufacture at present in universal use in the manufacture of such blasting explosives the nitrocellulose is mixed with the nitroglycerin, the other ingredients, if any, added, and the mixing completed by stirring while the mixture is heated by a water jacket maintained at an elevated temperature of for instance 60° C. to 70° C. The high temperature of mixing is necessary in order to effect the gelatinization of the nitrocellulose and the dangerous nature of the manufacture is largely due to this use of a high temperature during gelatinization, which also considerably increases the cost of the manufacture.

Now we have discovered that a suitable small proportion of the order of 0.1 to 1% on the nitroglycerin of any of the members of the classes of substances set out below if dissolved in the nitroglycerin will give the solutions the property of gelatinizing completely, in the cold, all classes of nitrocellulose, from the soluble variety, up to gun-cotton containing 13% nitrogen.

The following classes of substances possess this property:—

1. Urethanes, or esters of carbiminic acid.
2. Anilids.
3. Substituted ureas.
4. Condensation products of glycerol and other polyhydric alcohols with aldehydes.
5. Homologues of oxanilic ester.
6. The well-known solvents of nitrocellulose, *e. g.* acetone, acetic ester and amyl acetate.

The above-mentioned organic bodies and their chemical equivalents for the purposes of this invention, or mixtures thereof, are herein collectively referred to as organic accelerants for the gelatinization.

By the application of our discovery we are enabled entirely to avoid the usual elevation of temperature and we thereby materially reduce the danger of the preparation of this class of blasting explosives, and at the same time effect a very important economy in the manufacture. The addition to nitroglycerin of one or other of the accelerants of gelatinization which we have discovered to be effective increases its gelatinizing power to such an extent that complete gelatinization of a batch of explosives takes place in the cold more rapidly than it does at the present usual temperature of working, when nitroglycerin alone is used as gelatinizer. In this way the output of any given plant is increased.

Most of these accelerating agents possess also the property of stabilizing nitric esters. Explosives made by this new process therefore possess the further advantage that they are more chemically stable than those made by usual methods. The first five classes of substances indicated above as gelatinizing accelerants act also as stabilizers, and produce explosives of increased chemical stability.

This invention therefore consists in employing a small proportion of the order of 0.1 to 1% calculated on the nitroglycerin of a gelatinizing accelerant along with the nitroglycerin and nitrocellulose, so that the gelatinization can be effected without elevation of temperature.

This invention further consists in dissolving a small quantity of the order of 0.1 to 1% calculated on the nitroglycerin of one or more of the members of the above mentioned classes in the nitroglycerin, and then effecting the gelatinization of the soluble nitrocellulose therewith without elevation of temperature.

This invention further consists in employing as the gelatinizing accelerant a small quantity of the order of 0.1 to 1.0% calculated on the nitroglycerin of one or more of the members of such of the classes of substances above indicated as have also stabilizing properties.

In carrying this invention into effect in one form we dissolve a small quantity of one of the above accelerating agents in the nitroglycerin in a proportion varying from 0.1% to 1% and calculated on the nitroglycerin, according to the gelatinizing power of the particular substance selected, which must be determined experimentally in each case. We stir the nitrocellulose into the nitroglycerin solution, add the other ingredients, if any, and complete the mixing in the usual manner, but without elevation of temperature. A good blasting explosive is thus prepared in all respects equal to the corresponding product prepared by the method of hot gelatinization, while the risks attendant on the use of the latter process are avoided, the output of a given plant is increased, and the cost of manufacture is greatly reduced.

The following are examples of typical explosives according to this invention:—

*I. Modified blasting gelatin.*

| | |
|---|---|
| Nitroglycerin | 91.6% |
| Soluble nitrocellulose | 7.5% |
| Formanilid 0.2 | |
| Formo-toluidid 0.1 | 0.3% |
| Calcium carbonate | 0.6% |

*II. Modified gelignite.*

| | |
|---|---|
| Nitroglycerin | 60.8% |
| Soluble nitrocellulose | 3.8% |
| Potassium nitrate | 27.6% |
| Woodmeal | 7.2% |
| Formanilid 0.2 | |
| Formo-toluidid 0.1 | 0.3% |
| Calcium carbonate | 0.3% |

We find it advantageous to use a mixture of bodies such as formanilid and formo-toluidid, as although these are crystalline solids, the mixture of them is liquid at ordinary temperatures, and miscible in all proportions with nitroglycerin.

We find further that ordinary blasting gelatin of the following composition:

| | |
|---|---|
| Nitroglycerin | 90.6% |
| Nitrocotton | 8.8% |
| Chalk | 0.6% |
| | 100% | prepared by the usual service method at 60–70° C. requires about 75 minutes for gelatinization, while the corresponding modified blasting gelatin prepared according to Example I above at normal temperature requires only 55 minutes for gelatinization. Again, a gelignite of the following composition:

| | |
|---|---|
| Nitroglycerin | 61.1% |
| Nitrocotton | 3.8% |
| Woodmeal | 7.2% |
| Potassium nitrate | 27.6% |
| Chalk | 0.3% |
| | 100.0% | prepared by the usual service method at 60–70° C. requires about 75 minutes for gelatinization, while the modified gelignite of Example II above prepared at normal temperature, requires only 45 minutes for gelatinization.

The well-known solvents of nitrocellulose can be used in similar proportions in carrying out this invention as above indicated, but with less advantage, because, being volatile, they tend to introduce another source of danger which requires care to secure its avoidance.

Having now described our invention, what we claim as new and desire to secure by Letters Patent is:—

1. Method of preparing a blasting explosive containing nitroglycerin and gelatinized nitrocellulose, comprising incorporating with the said mixture small proportions, of the order of 0.1 to 1.0% calculated on the nitroglycerin, of an organic accelerant for the gelatinization, and effecting gelatinization without material elevation of temperature.

2. Method of preparing a blasting explosive containing nitroglycerin and gelatinized nitrocellulose, comprising incorporating with the said mixture small proportions of the order of 0.1 to 1.0% calculated on the nitroglycerin, of an organic accelerant for the gelatinization, incorporating with the said mixture the remaining ingredients of the explosive composition, and effecting gelatinization without material elevation of temperature.

3. Method of preparing a blasting explosive containing nitroglycerin and gelatinized nitrocellulose, comprising incorporating with the said mixture small proportions, of the order of 0.1 to 1.0% calculated on the nitroglycerin, of an organic accelerant for the gelatinization, said accelerant possessing also stabilizing properties, and effecting gelatinization without material elevation of temperature.

4. A blasting explosive containing nitroglycerin and gelatinized nitrocellulose, in which the ratio of nitroglycerin to nitrocellulose exceeds unity, said explosive containing a small proportion, of the order of 0.1 to 1.0% calculated on the nitroglycerin, of an organic accelerant for the gelatinization.

5. A blasting explosive containing nitroglycerin and gelatinized nitrocellulose, in which the ratio of nitroglycerin to nitrocellulose exceeds unity, said explosive containing a small proportion, of the order of 0.1 to 1.0% calculated on the nitroglycerin, of an organic accelerant for the gelatinization, said accelerant possessing also stabilizing properties.

In testimony whereof we have signed our names to this specification.

WILLIAM RINTOUL.
DONALD CROSS.